Patented July 5, 1949

2,475,122

UNITED STATES PATENT OFFICE 2,475,122

HYDROCHLOROSILYL ADDITION PRODUCT WITH RUBBER

Arthur J. Barry and Donald E. Hook, Midland, and Lee De Pree, Holland, Mich., assignors, by mesne assignments, to The Dow Chemical Company, Midland, Mich., a corporation of Delaware No Drawing. Application August 19, 1948, Serial No. 45,204

8 Claims. (Cl. 260—85.1)

This invention relates to chlorosilyl derivatives of polyolefinic hydrocarbons and to their preparation.

In our copending application Serial Number 674,925, filed June 6, 1946, of which the present application is in part a continuation, it is shown that an olefine may be reacted with a polyhalomonohydrosilane such as trichlorosilane at temperatures below 400° C., whereby an addition product is obtained.

It is an object of the present invention to provide methods for the preparation of siliconcontaining derivatives of polyolefinic hydrocarbons.

In accordance with the present invention, a polyolefinic rubber hydrocarbon is reacted with a polychloromonohydrosilane. The reaction is conducted at an elevated temperature under conditions such that at least a portion of the reaction mixture is in liquid phase. The product is an addition product of the polymeric rubber hydrocarbon and the silane.

Suitable rubber hydrocarbons for the purpose of this invention are natural rubber, gutta percha, balata and elastomeric butadiene-styrene copolymers. These rubber hydrocarbons may be either in unvulcanized state or in vulcanized state provided that the rubber hydrocarbon contains a plurality of olefinic linkages per molecule, i. e., it is a polyolefine.

The polychloromonohydrosilanes employed in the present invention are compounds of silicon which contain one hydrogen atom and from two to three chlorine atoms all bonded directly to the single silicon atom in the molecule, the remaining valence, if any, of the silicon atom being satisfied by a methyl or phenyl radical. Suitable polychloromonohydrosilanes are trichlorosilane, $HSiCl_3$, methyldichlorosilane, $CH_3SiHCl_2$, and phenyldichlorosilane, $C_6H_5SiHCl_2$. It is preferred to employ from 0.1 to 2.0 molecules of the silane per olefine bond in the rubber hydrocarbon.

The reaction mixture is heated at a temperature below 400° C., and preferably from 150° to 325° C., under a pressure such that at least a portion of the reaction mixture is in liquid phase. This may be accomplished conveniently by operating batchwise in a closed system of suitable size under autogenous pressure, or continuously as in an autoclave under superimposed pressure. At temperatures below 150° C., the rate of reaction is too low to be of practical utility. At temperatures above 150° C. and within the range stated, the reaction proceeds satisfactorily. It is preferred to operate at temperatures below 325° C. since at between 150° and 325° C. high molecular weight products result. At temperatures above 325° C., more extensive depolymerization occurs with the production of lower molecular weight addition products.

It has been found that even partially vulcanized rubber is swelled and distended by polyhalomonohydrosilanes employed in the present process. Thus when the two are mixed intimate contact of the two is effected, without the addition of any supplementary solvent. It is preferred to conduct the reaction in the presence of a liquid hydrocarbon of the group consisting of aromatic and saturated aliphatic hydrocarbons to act as a diluent and to assist in the swelling and distension of the rubber. Suitable hydrocarbons for this purpose are benzene, toluene and heptane, for example. While we have shown that benzene reacts with a polychloromonohydrosilane to a more or less limited extent, such side reaction is negligible under the conditions of the present invention. It is preferred to employ from 1 to 20 parts of solvent per 10 parts of the combined weights of other ingredients of the reaction mixture.

By the process of this invention, interaction takes place, whereby polychlorosilyl groups are introduced into the organic polymer through carbon-silicon linkages. When the reaction mixture contains more than one molecule of polychloromonohydrosilane per olefine bond of the organic material, the product of reaction contains few if any residual olefinic linkages, and has a silicon content which indicates the addition of a silyl group at each such olefinic linkage. In such instance the product hydrolyzes, as in air, to a hard resinous body. When less than one mol of polychloromonohydrosilane per double bond is reacted with the hydrocarbon polymer, the product contains residual olefinic linkages, and is a more elastomeric product. This type of material is subject to vulcanization with sulfur.

The products of this invention are useful as hydrophobing agents and as film-forming materials which set up to strongly adherent coatings particularly useful for application to glass and ceramics. Organic dyes and pigments may be added to the films whereby colored coatings are obtained. These new compositions may also be employed in the preparation of a wide variety of hitherto unknown silicon-containing compositions.

Example 1

*Hevea braziliensis* which had been slightly vulcanized and had an iodine number of 311 was placed in trichlorosilane in amount to supply 17 molecules of the latter per double bond in the rubber. This was allowed to stand overnight at room temperature. It was found that the rubber had been distended to several times its prior volume by the trichlorosilane. Studies of reaction kinetics indicate that reaction took place at a low rate during this period. The rate of reaction was increased by heating the reaction mixture. The mixture was warmed up to 195° C. during the course of one hour and held at 195°–200° C. for 30 minutes during which time the solid polymer disappeared due to further reaction with the trichlorosilane and solution of the reaction product. The reaction mixture was then heated up to 250° C. in one hour's time, at which time there was a small volume of liquid phase in the bottom of the reactor. The heat was then turned off and the autoclave cooled to 70° in 2 hours' time. The bomb containing the reaction mixture was then opened and excess trichlorosilane was removed from the reaction product by distillation to 100° C. at 2 mm.

The residue was a viscous liquid which could be drawn into threads. When this liquid residue was mixed with water the chlorine bonded to silicon was hydrolyzed. By condensation of the hydrolyzate a white flock was formed which was in physical character similar to factice.

Example 2

180 grams of a mixture of 2 parts by weight trichlorosilane, 1 part vulcanized natural rubber having an iodine number of 313.2, (1 molecule silane per double bond), and 2.3 parts benzene was heated in a bomb of 500 milliliter capacity for 16 hours at 300° C. During the heating period the maximum pressure developed within the bomb was 820 pounds per square inch. The bomb was cooled and the reaction product was heated on a steam bath under reduced pressure, to remove volatile components. The sticky residual product was soluble in benzene. It contained 41.1 percent carbon, 11.7 percent silicon and 39.4 percent hydrolyzable chlorine.

Example 3

A mixture of 1 part by weight trichlorosilane, 3 parts *Hevea braziliensis* in the form of smoked sheet, (1 molecule silane per 5 double bonds), and 8.3 parts benzene was heated in a bomb at an average temperature of 300° C. for 16.5 hours. The maximum pressure developed within the bomb was 775 pounds per square inch. The major portion of the reaction product was a dark brown liquid. Sheet glass was dipped into a dilute benzene solution of the material and allowed to stand exposed to air at room temperature. The coating dried to a clear, strongly adhering film.

Example 4

A mixture of 1 part by weight trichlorosilane, 6 parts *Hevea braziliensis* in the form of smoked sheet (1 molecule silane per 10 double bonds), and 23 parts benzene was heated in a bomb for 16 hours at a temperature of from 299 to 302° C. The major portion of the soft, tacky reaction product was soluble in benzene. It contained 84.0 percent carbon, 0.88 percent silicon and 1.04 percent hydrolyzable chlorine.

Glass plates were dipped into a benzene solution of the product, and the benzene was allowed to evaporate. A tacky, tough, adherent coating was thereby produced. Heating the coated plate at 100° C. for 16 hours, resulted in a tack-free product.

Example 5

A mixture of 3.36 parts by weight trichlorosilane, 1 part of *Hevea braziliensis* in the form of smoked sheet, (2 molecules of silane per double bond), and 1.9 parts benzene was heated in a bomb for 16 hours at from 294° to 308° C. The maximum pressure attained within the bomb was 1020 pounds per square inch. The reaction mixture was removed from the bomb, and heated to volatilize low boiling components, such as unreacted trichlorosilane, silicon tetrachloride. The residual product, in benzene solution, contained a small amount of finely divided resinous material, which was removed by centrifugation and subsequent decantation. The decanted product was a dark brown liquid, which after removal of benzene was a mobile, very viscous liquid. This addition product contained 22.9 per cent carbon, 13.8 percent silicon and 46.4 percent chlorine.

A thin film of the liquid in benzene solution was applied to sheet glass, and allowed to stand in air at room temperature. After 1.5 hours, the film was tack-free and clear. It was quite hard, and adhered strongly to the glass.

Example 6

A mixture of 1.7 parts by weight trichlorosilane, 1 part *Hevea braziliensis* in the form of smoked sheet, (1 molecule silane per double bond), and 1.9 parts benzene was heated in a bomb for 2 hours at a temperature of from 295° to 308° C., during which time the maximum pressure developed within the bomb was 710 pounds per square inch. The reaction product was soluble in benzene, and contained 11.14 percent silicon and 35.4 percent hydrolyzable chlorine.

Example 7

A mixture 1.7 parts by weight trichlorosilane, 1 part *Hevea braziliensis* in the form of smoked sheet, (1 molecule silane per double bond), and 1.9 parts benzene was heated in a bomb for 16 hours at a temperature of from 200° to 210° C. and a maximum pressure of 200 pounds per square inch. The reaction product after removal of benzene was a light brown, very viscous liquid, readily soluble in benzene. A thin film, applied from a benzene solution, on sheet glass was tack-free after standing in air at ordinary temperature for 2 days. The film was smooth, lustrous and adherent.

Example 8

A mixture of 1.4 parts by weight methyldichlorosilane, 1 part *Hevea braziliensis* in the form of smoked sheet, (1 molecule silane per double bond), and 1.9 parts benzene was heated in a bomb at a temperature of from 295° to 300° C. for 16 hours, during which time the maximum pressure was 915 pounds per square inch. The major portion of the reaction product was a thin liquid soluble in benzene, and contained 54.4 percent carbon, 11.2 percent silicon and 26.7 percent chlorine.

A thin film of the product was applied from benzene solution to sheet glass. It was slightly tacky after drying in air at room temperature for 5 hours, but very adherent to the glass. When heated at 110° C. for 3.5 hours the film was tack-free.

Example 9

A mixture of 2.2 parts by weight phenyldichlorosilane, 1 part *Hevea braziliensis* in the form of smoked sheet, (1 molecule silane per double bond), and 1.9 parts benzene was heated in a bomb at a temperature of from 296° to 308° C. for 16 hours during which time the maximum pressure was 500 pounds per square inch. The major portion of the reaction product was a dark brown viscous liquid which contained 59.2 percent carbon, 9.5 percent silicon and 21.2 percent chlorine. A 50 percent solution of the product in xylene was applied as a thin film to sheet glass, which was then let stand in air at room temperature. After 30 days, such film was tough, clear, very adherent and only slightly tacky.

Example 10

A mixture of 1.7 parts by weight trichlorosilane, 1 part of an unvulcanized GR-S type rubber, (75-butadiene, 25-styrene copolymer), (1 molecule silane per double bond), and 1.9 parts benzene was heated in a bomb for 16 hours at a temperature of from 298° to 302° C., and a maximum pressure of 810 pounds per square inch. The major portion of the reaction product was a brown, very viscous liquid, which contained 43.5 percent carbon, 10.32 percent silicon and 35.47 percent hydrolyzable chlorine.

A glass plate was coated by dipping it into a benzene solution containing 46 percent by weight of the above product. The coating was clear, smooth and tack-free after standing in air at ordinary temperature for 15 minutes.

Example 11

A mixture of 1.7 parts by weight trichlorosilane, 1 part gutta percha in the form of smoked sheet, (1 molecule silane per double bond), and 1.9 parts benzene was heated in a bomb for 16.5 hours at a temperature of from 287° to 300° C. and a maximum pressure of 800 pounds per square inch. The reaction product was soluble in benzene.

A 50 percent solution of the product in benzene was applied as a coating to glass plates. The coating dried to tack-free condition in 5 to 10 minutes in air at room temperature. It did not change after heating for 5 hours at 105° C. The resultant coating was white, opaque, hard, and adhered strongly to the glass surface.

Example 12

A mixture of 1 part by weight trichlorosilane, 6 parts gutta percha in the form of smoked sheet, (1 molecule silane per 10 double bonds), and 2.3 parts benzene was heated in a bomb for 16 hours at a temperature of from 293° to 307° C. and a maximum pressure of 850 pounds per square inch. The reaction product was soluble in benzene.

A 50 percent solution of the product was applied as a coating to glass plates. The coating was clear, transparent, dark in color, and tacky after five hours air drying at room temperature. After 5 hours heating at 105° C., it was tack-free, clear, tough and very adherent.

Example 13

A mixture of 1 part by weight trichlorosilane, 1.2 parts gutta percha in the form of smoked sheet, (1 molecule silane per 2 double bonds), and 3.5 parts benzene was heated in a bomb for 16 hours at a temperature from 287° to 300° C., and a maximum pressure of 785 pounds per square inch. The reaction product was soluble in benzene. It formed a hard, strongly adherent, white coating on glass, when applied from benzene solution, and allowed to dry in air at room temperatures.

Example 14

A mixture of 40.5 grams of balata, 34 grams of trichlorosilane and 117 grams of benzene is heated in a 0.5 liter bomb for 16 hours at 275° to 300° C. A reaction product is obtained which contains silicon linked to the carbon chain of the hydrocarbon and hydrolyzable chlorine bonded to the silicon.

That which is claimed is:

1. The process which comprises reacting a polyolefinic rubber hydrocarbon of the group consisting of natural rubber, gutta percha, balata and elastomeric butadiene-styrene copolymers with a polychloromonohydrosilane of the group consisting of trichlorosilane, methyldichlorosilane and phenyldichlorosilane at a temperature of from room temperature to 400° C., and at a pressure such that at least a portion of the reaction mixture is in liquid phase, whereby an addition product of the rubber hydrocarbon and the silane is produced.

2. The process which comprises reacting a polyolefinic rubber hydrocarbon of the group consisting of natural rubber, gutta percha, balata and elastomeric butadiene-styrene copolymers with a polychloromonohydrosilane of the group consisting of trichlorosilane, methyldichlorosilane and phenyldichlorosilane in the proportions of from 0.1 to 2.0 molecules of the latter per olefinic bond of the former, at a temperature of from 150 to 325° C., and at a pressure such that at least a portion of the reaction mixture is in liquid phase, whereby an addition product of the rubber hydrocarbon and the silane is produced.

3. The process which comprises maintaining a reaction mixture consisting of a polyolefinic rubber hydrocarbon of the group consisting of natural rubber, gutta percha, balata and elastomeric butadiene-styrene copolymers and a polychloromonohydrosilane of the group consisting of trichlorosilane, methyldichlorosilane and phenyldichlorosilane in the proportions of from 0.1 to 2.0 molecules of the latter per olefinic bond of the former in the presence of from 1 to 20 parts by weight of a liquid hydrocarbon free of aliphatic unsaturation per 10 parts of the combined weights of said rubber hydrocarbon and said silane at a temperature of from 150° to 325° C., and at a pressure such that at least a portion of the reaction mixture is in liquid phase, whereby an addition product of the rubber hydrocarbon and the silane is produced.

4. The process which comprises maintaining a mixture comprising a polyolefinic rubber hydrocarbon of the group consisting of natural rubber, gutta percha, balata and elastomeric butadiene-styrene copolymers and trichlorosilane in the proportions of from 0.1 to 2.0 molecules of the latter per olefinic bond of the former, in the presence of from 1 to 20 parts by weight of a liquid hydrocarbon free of aliphatic unsaturation per 10 parts of the combined weights of said rubber hydrocarbon and said silane at a temperature of from 150° to 325° C., and at a pressure such that at least a portion of the reaction mixture is in liquid phase, whereby an addition product of the rubber hydrocarbon and the silane is produced.

5. The process which comprises maintaining a mixture comprising a polyolefinic rubber hydrocarbon of the group consisting of natural rubber, gutta percha, balata and elastomeric butadiene-styrene copolymers and methyldichlorosilane in the proportions of from 0.1 to 2.0 molecules of the latter per olefinic bond of the former, in the presence of from 1 to 20 parts by weight of a liquid hydrocarbon free of aliphatic unsaturation per 10 parts of the combined weights of said rubber hydrocarbon and said silane at a temperature of from 150° to 325° C., and at a pressure such that at least a portion of the reaction mixture is in liquid phase, whereby an addition product of the rubber hydrocarbon and the silane is produced.

6. The process which comprises maintaining a mixture comprising a polyolefinic rubber hydrocarbon of the group consisting of natural rubber, gutta percha, balata and elastomeric butadiene-styrene copolymers and phenyldichlorosilane in the proportions of from 0.1 to 2.0 molecules of the latter per olefinic bond of the former, in the presence of from 1 to 20 parts by weight of a liquid hydrocarbon free of aliphatic unsaturation per 10 parts of the combined weights of said rubber hydrocarbon and said silane at a temperature of from 150° to 325° C., and at a pressure such that at least a portion of the reaction mixture is in liquid phase, whereby an addition product of the rubber hydrocarbon and the silane is produced.

7. A hydro-polychlorosilyl addition product of a polyolefinic rubber hydrocarbon selected from the group consisting of natural rubber, gutta percha, balata, and elastomeric butadiene-styrene copolymers said polychlorosilyl being of the group consisting of trichlorosilyl, methyldichlorosilyl, and phenyldichlorosilyl.

8. A hydro-polychlorosilyl addition product of a polyolefinic rubber hydrocarbon of the group consisting of natural rubber, gutta percha, balata, and elastomeric butadiene-styrene copolymers which addition product contains a plurality of polychlorosilyl radicals of the group consisting of trichlorosilyl, methyldichlorosilyl and phenyldichlorosilyl radicals each attached to a carbon atom of the hydrocarbon by a carbon to silicon bond.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,379,821 | Miller et al. | July 3, 1945 |
| 2,407,181 | Scott | Sept. 3, 1946 |